(12) United States Patent
Ashdown et al.

(10) Patent No.: US 6,668,051 B1
(45) Date of Patent: Dec. 23, 2003

(54) INTELLIGENT COMMUNICATIONS POINT PLATFORM

(75) Inventors: Mike Ashdown, Frisco, TX (US); Hu Shen, Plano, TX (US); Steve Lynchard, San Antonio, TX (US); Robert Winslow, Dallas, TX (US)

(73) Assignee: Sevis Systems, Inc., Dallas, TX (US)

( * ) Notice: Subject to any disclaimer, the term of this patent is extended or adjusted under 35 U.S.C. 154(b) by 0 days.

(21) Appl. No.: 09/536,541

(22) Filed: Mar. 28, 2000

(51) Int. Cl.⁷ .............................................. H04M 7/00
(52) U.S. Cl. ............................ 379/221.08; 379/221.01; 370/352; 370/353
(58) Field of Search ..................... 379/201.01, 207.02, 379/220.01, 221.01, 221.08, 221.09, 221.1; 370/352, 353, 356

(56) References Cited

U.S. PATENT DOCUMENTS

| | | |
|---|---|---|
| 5,319,638 A | 6/1994 | Lin |
| 5,377,327 A | 12/1994 | Jain et al. |
| 5,659,542 A | 8/1997 | Bell et al. ..................... 370/496 |
| 5,691,985 A | 11/1997 | Lorenz et al. |
| 5,696,809 A | 12/1997 | Voit ............................... 379/5 |
| 5,701,301 A | 12/1997 | Weisser, Jr. |
| 5,706,286 A | 1/1998 | Reiman et al. .............. 370/401 |
| 5,774,668 A | 6/1998 | Choquier et al. |
| 5,802,285 A | 9/1998 | Hirviniemi |
| 5,822,422 A | 10/1998 | Daase et al. ................. 379/269 |
| 5,870,464 A | 2/1999 | Brewster et al. ............ 379/219 |
| 5,917,900 A | 6/1999 | Allison et al. ............... 379/220 |
| 5,933,490 A | 8/1999 | White et al. |
| 5,951,694 A | 9/1999 | Choquier et al. |
| 5,956,024 A | 9/1999 | Strickland et al. ........... 345/327 |
| 5,958,016 A | 9/1999 | Chang et al. ................ 709/229 |
| 5,966,431 A | 10/1999 | Reiman et al. .............. 379/115 |
| 5,983,281 A | 11/1999 | Ogle et al. |
| 5,983,282 A | 11/1999 | Yucebay |
| 5,987,118 A | 11/1999 | Dickerman et al. .......... 379/265 |

*Primary Examiner*—Creighton Smith
(74) *Attorney, Agent, or Firm*—Haynes & Boone, LLP

(57) ABSTRACT

A system and method for host signaling processing that allows multiple SS7 applications to have visibility to the SS7 network traffic and the ability to control the SS7 network traffic. The applications residing on the platform have visibility to the SS7 traffic flowing through the Intelligent Communications Point (ICP) Platform, ability to control and modify the traffic and the ability to inject new SS7 traffic onto the SS7 links. The ICP platform will provide basic services that applications can use including Logging Data, Process Events, Inter Process Communication Services, and an interface to the Intelligent Communications Manager which provides a graphical user interface to manage the ICP. In addition to these services, the ICP Platform will provide basic traffic metering and measurement, bookkeeping statistics, and a failsafe mechanism for the SS7 links.

17 Claims, 6 Drawing Sheets

INTELLIGENT COMMUNICATIONS POINT PLATFORM

RELATED PATENT APPLICATIONS

This application relates to the following United States Patent Application, incorporates them by reference in their entirety and is assigned to the assignee of the present invention:

| Serial No.: | Filing Date: | Inventors: | Title: |
| --- | --- | --- | --- |
| 09/536,958 | 3/28/2000 | Ashdown et al. | New and Improved System and Method for Data Traffic Redirection |
| 09/537,016 | 3/28/2000 | Ashdown et al. | System and Method for a Local Number Portability Cache |
| 09/391,295 | 09/07/99 | Ashdown et al. | SS7 Firewall System |

FIELD OF THE INVENTION

This invention relates generally to the Common Channel Signaling System 7 (SS7) network technology and, more particularly, to a host signaling processing platform that allows multiple SS7 applications to have visibility to SS7 network traffic while also having the ability to control SS7 network traffic.

BACKGROUND

The SS7 network is the backbone of the world's telecommunications networks. Service providers across the globe rely on the SS7 network to implement setup, routing, and control of a call, as well as to provide residential, business, and government customers advanced services such as 800 and 900 calling, caller ID, local number portability, and calling card verification. Without the SS7 network, the world's telecommunications networks would not function as we know it today.

SS7 is a means to exchange information between nodes (switching systems, network data bases, or operator service systems) in a signaling network where messages are not carried over voice circuits but instead utilize separate links to convey the signaling information. Traditional interoffice signaling uses in-band signals to convey signaling information. Communications on an SS7 network falls into two distinct categories, command and control signals and network-traffic. However, general voice traffic is carried in-band on voice channels. Command and control signals are carried out-of-band and are used to manage the network traffic. The SS7 network is comprised of a number of different types of signaling nodes, including Service Switching Points (SSPs), Signaling Transfer Points (STPs), and Service Control Points (SCPs). SSPs originate, manage, and terminate calls. SCPs act as centralized databases that validate, authorize and answer service requests from SSPs, such as how to route an 800 number call. STPs route SS7 messages between SSPs, SCPs, and other STPs.

The SS7 Network uses six types of signaling data links to connect the various nodes. The link specific functions and associated types of nodes with which they interact are described as follows:

| A LINKS | STP-SSP SAME NETWORK |
| --- | --- |
| | STP-SCP SAME NETWORK |
| B LINKS | STP-STP SAME HIERARCHY LEVELS |
| C LINKS | STP-STP MATED PAIRS |
| D LINKS | STP-STP DIFFERENT HIERARCHY LEVELS |
| E LINKS | STP-STP DIFFERENT NETWORKS/STP |
| | STP-SCP DIFFERENT NETWORKS/STP |
| F LINKS | SSP-SSP SAME NETWORK |

A LINKS (Access Links) carry the primary traffic of the network in the SS7 configuration. B-LINKS (Bridge Links) interconnect STP mated pairs to other mated STP pairs of the same hierarchical level. C LINKS (Cross Links) interconnect STP mated pairs together and are used primarily for administrative traffic. They can also carry message traffic if needed. D LINKS (Diagonal Links) interconnect STPs of different hierarchical levels which are primary and secondary signaling transfer points (i.e. regional STP to local STP). E LINKS (Extended Links) connect a switching office [SSP or Signaling Point (SP)] to an STP other than its home STP. F LINKS (Fully Associated Links) connect SSPs to other SSPs and are used for associated signaling between the two. These SSPs must be adjacent nodes.

However, never has a system and method been created that can have visibility into the SS7 network, but not interrupt it, and yet it provides the ability to build SS7 based applications efficiently and seamlessly.

SUMMARY OF THE INVENTION

The present invention attempts to solve these problems. Accordingly, the present invention describes a system and method for providing a basic set of core services that will allow multiple SS7 based applications to be developed and deployed. The present invention includes an Intelligent Communication Point (ICP) Platform which is managed by a Graphical User Interface (QUI) known as the Intelligent Communication Manager (ICM). Moreover, multiple ICP Platforms can be managed by the ICM. The ICP can reside on a computer that contains one or more Central Processing Units (CPUs) and supports the SS7 interface. A real-time operating system is deployed on the computer and provides, not only high availability support, but also supports the hot swap standards.

These and other objectives and features of the invention encompass a comprehensive system for providing an active SS7 platform for building SS7 based applications.

Therefore, in accordance with the previous summary, objects, features and advantages of the present invention will become apparent to one skilled in the art from the subsequent description and the appended claims taken in conjunction with the accompanying drawings.

DETAILED DESCRIPTION

First a brief overview of the present invention's preferred embodiment will be described and then will be described in greater detail in reference to the figures. To start with, the ICP Platform is not an end point in the network, but rather an invisible node that sits in front of a Signaling End Point (SEP), which may be, for example, a Signaling Transfer Point (STP), Service Switching Point (SSP), or Service Control Point (SCP). All SS7 links are routed into the ICP and are then routed out to the SS7 network. In addition, the ICP Platform design can be broken down into five parts; SS7 links cards and SS7 stack, interface to the ICM, platform core services, software and hardware control/status, and the application region.

SS7 Link Cards and SS7 Stack

The ICP Platform contains multiple T1/E1 link cards. All SS7 links from an SSP are routed into the ICP and then out to the SS7 network. Each link card supports multiple links and processes Message Transfer Part (MTP) layers 1 and 2, while the CPU host card supports the ICP core services, applications, and MTP layer 3. MTP1 defines the physical, electrical, and functional characteristics for the digital signaling link. MTP2 ensures accurate end-to-end transmission of a message across a signaling link. In addition, MTP2 implements flow control, message sequence validation, and error checking. When an error occurs on a signaling link, the message (or set of messages) is retransmitted. Moreover, MTP2, which resides on the link cards, has a failsafe mode. When MTP3 fails, MTP2 will automatically route traffic between the SEP and the SS7 network.

Figure 3:
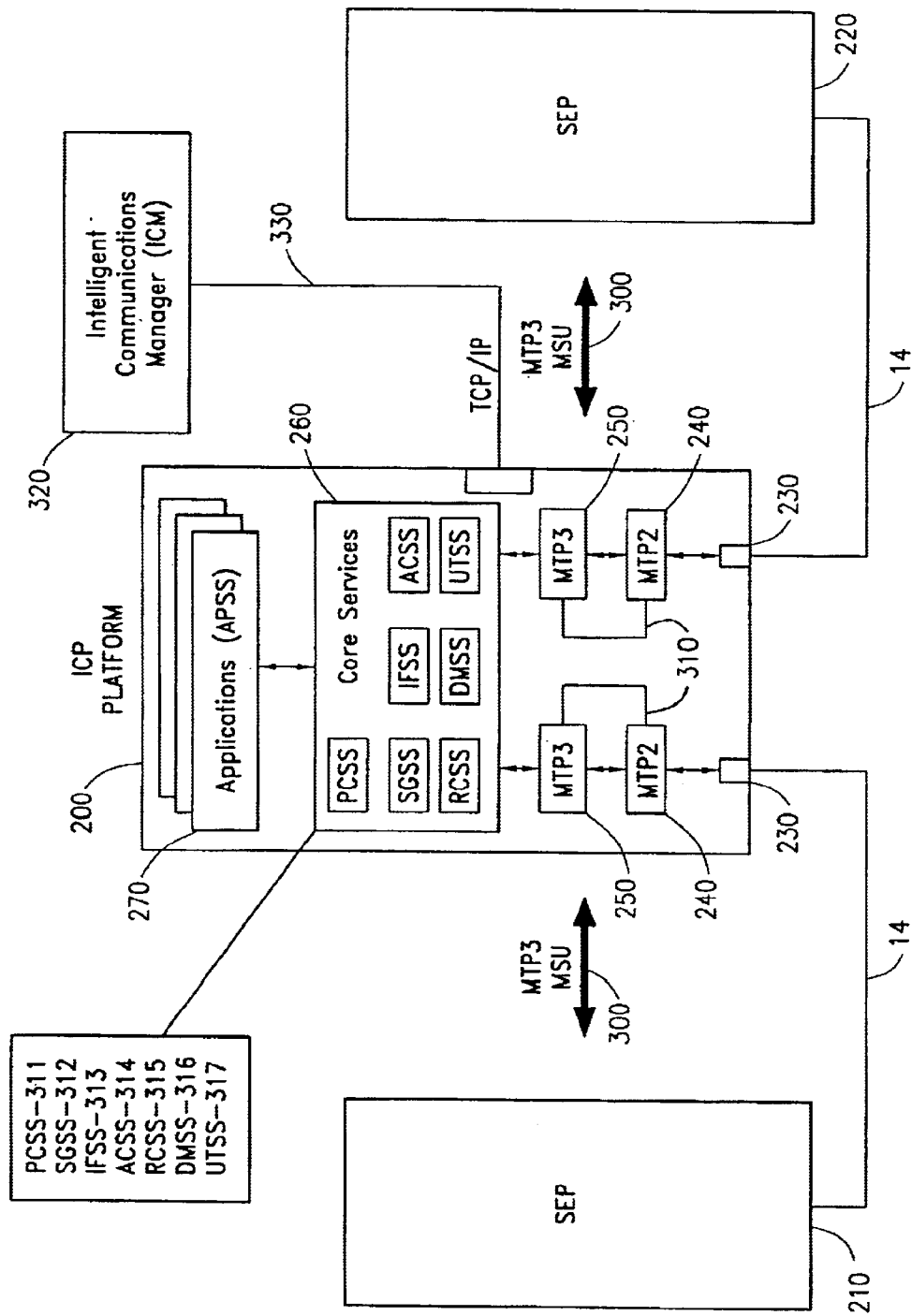
FIG. 3 is a block diagram of SS7 network link routing.

MTP3 provides message routing between signaling points in the SS7 Network and routes traffic away from failed links and signaling points. In addition, MTP3 controls traffic when congestion occurs. In the ICP Platform, two links are required to achieve the usage of one normal link. The ICP sits between an SSP and SS7 network and literally breaks the link into two links. These two links are considered to be one link pair. All SS7 traffic coming in one link will be routed out of the ICP through the other link of the link pair (FIG. 3). If the ICP fails due to hardware or software failures, these link pairs close allowing the SS7 traffic to pass through the ICP as if the ICP was not in the network. The link pairs can also be manually closed while still allowing the ICP to have visibility to the SS7 traffic flowing through the link pairs. In addition, link cards route non-SS7 traffic on open DS-0 data lines directly to the other port without going through the ICP.

Interface to the Intelligent Communication Manager (ICM)

The ICP Platform is managed by the ICM. The ICP interface is the bridge for communications between the ICP and the ICM. Through this interface software, the ICM user can gain access to the ICP core services and application software. The interface allows the user to bring the ICP into service, bring up and down application software, retrieve ICP core service data such as logs and events, retrieve application specific data, and configure/status the ICP hardware/software.

Platform Core Services

The ICP Platform provides a set of core services for the developers of the applications to use when designing the application, including Logging Data, Process Events, Peg Counting, and the SS7 message interface (FIG. 3). Logging Data services allow the applications to collect data which can be passed to the ICM for display to the customer. Process Event service is a method in which alarms can be raised to inform customers of an event that may or may not be critical. Each event is marked with a severity level which indicates to the user whether the event needs attention or not. Peg Counting services are tied in with the traffic metering and measurement (TMM) and bookkeeping processes. Along with the core set of peg counts, applications will also have their own sets of peg counts that can be collected and displayed on the ICM through the TMM graphical user interface (GUI). The SS7 message interface service allows applications to have access to SS7 traffic flowing through the ICP. The ICP processes all SS7 traffic according to rules. These rules define the actions as to how the SS7 message is going to be processed. Customers can implement rules that will act as a SS7 Firewall to protect the SEP (refer to the pending SS7 Firewall System patent, dated Sep. 7, 1999). Applications can receive SS7 traffic by implementing application rules that pass the message from the stack up through to the application, or can send out SS7 messages through an ICP SS7 API (Application Programming. Interface).

Software and Hardware Control/Status

Figure 4:
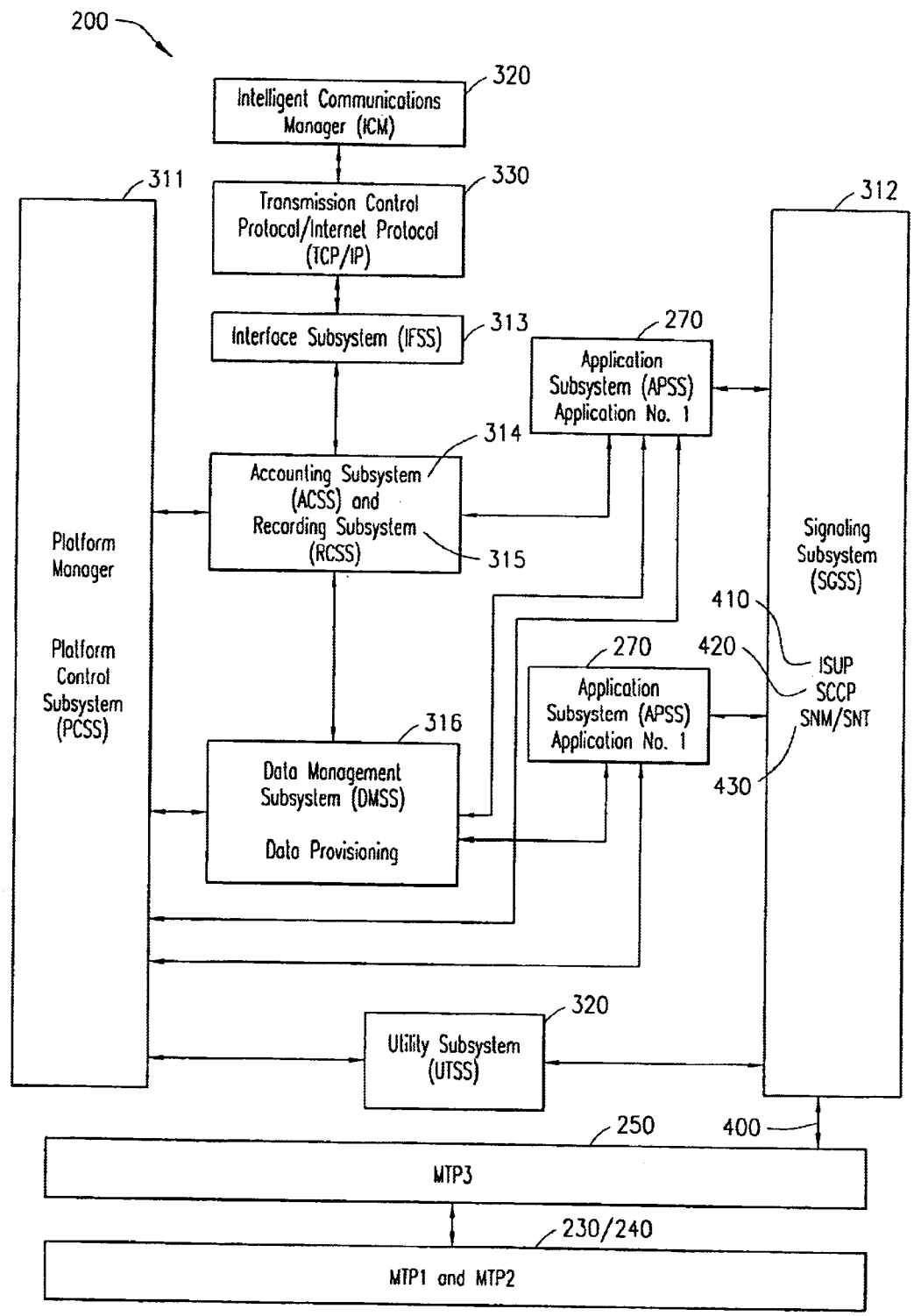
FIG. 4 is a functional diagram of the ICP Platform.

Software on the ICP is managed by the platform manager (FIG. 4). The platform manager is responsible for starting core services and applications. In the event of a software failure, the platform manager will attempt to restart the failed software along with raising events to the ICM and closing the link pairs so that SS7 traffic is not disrupted. The manager software will send status of the software and overall ICP health to the ICM through the ICP interface software. The hardware and the SS7 stack configuration are handled by System Management Software. Through the use of a configuration file stored on the ICM, the System Management Software programs the hardware interfaces such as the SS7 link cards and configures the SS7 stack software. Status of the hardware and state of the paired links (open or closed) are sent to the ICM through the ICP interface software.

Application Region

The heart of the ICP Platform is its ability to host any number of different SS7 applications (FIG. 3). Local Number Portability Cache (LNPC) is just one example of an application that could be developed for the ICP Platform. Through the use of the ICP core services, developers can design applications that can interact with the SS7 network. Application Programming Interfaces (APIs) are available to the application designers. These APIs allow the designers access to the core services and aid in the development process.

Figure 1:
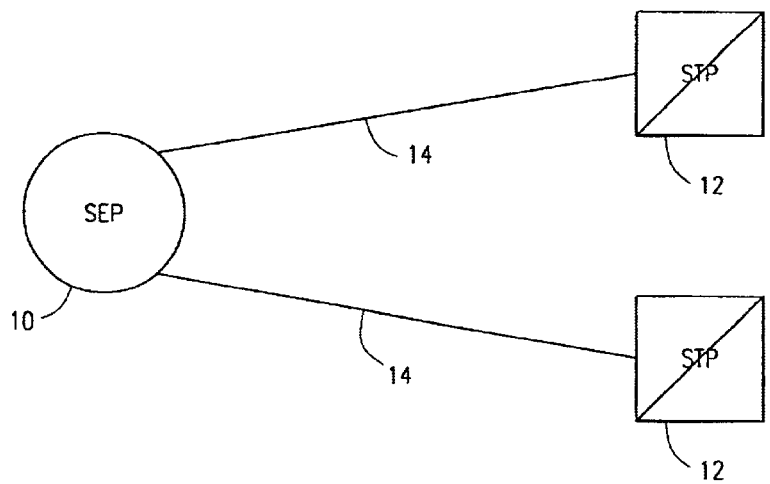
FIG. 1 is a block diagram of signaling end point connections in an SS7 network.

Now referring to the figures, FIG. 1 represents the end point connections in a SS7 network. Reference numeral 10 designates a signaling end point (SEP) which may be, for example, a Signaling Transfer Point (STP), Service Switching Point (SSP) or Service Control Point (SCP) and reference numeral 12 designates signaling transfer points (STPs). In a typical SS7 network, traffic flows on data links 14 between STPs and SEPs.

Figure 2:
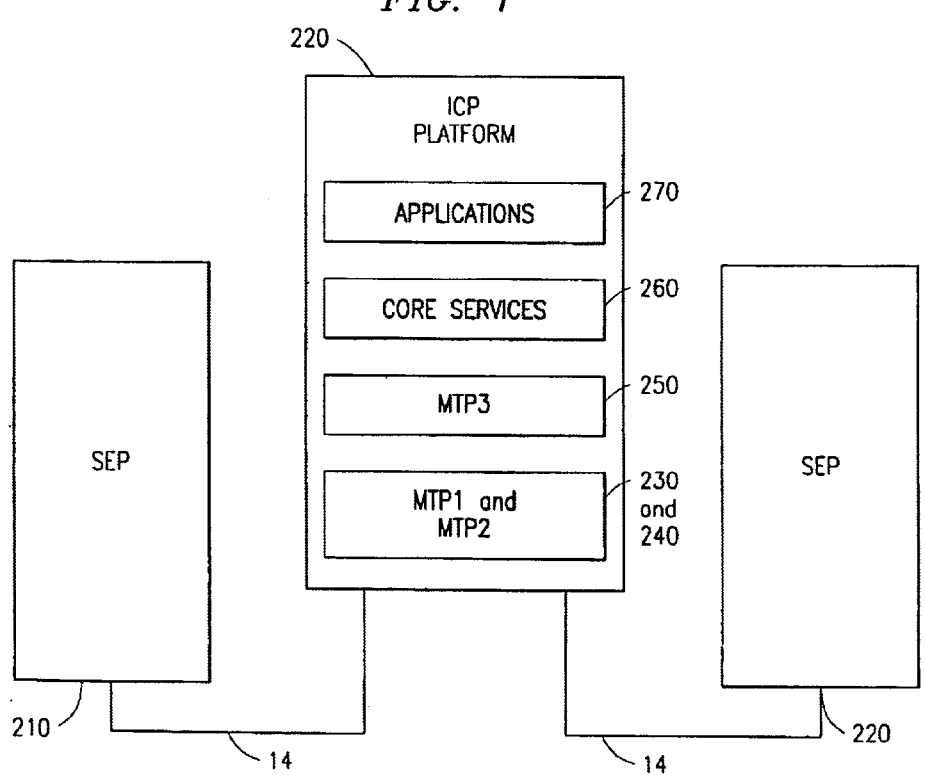
FIG. 2 is an overview of the ICP Platform.

FIG. 2 illustrates the placement of the ICP Platform 200 within the SS7 network. The ICP Platform 200 is not an end point in the SS7 network but rather an invisible node that sits in front of an SEP 210/220, which may be for example, an STP, SSP or an SCP. All SS7 data links 14 are routed into the ICP Platform 200 and are then routed out to the SS7 network. The SS7 network includes redundant DS-1 or DS-0A links 14, which are high speed serial links.

ICP Platform 200 processing distribution is driven by the signaling protocol stack as shown in FIG. 2. The MTP1/MPT2 230/240 layer has a number of link cards (E1/T1). The MTP1/MTP2 230/240 layer is loosely coupled with the MTP3 250 layer allowing MTP1/MPT2 230/240 to reside on the link cards and MTP3 250 to reside on the single board computer. MTP1 230 defines the physical, electrical, and functional characteristics for the digital signaling link. MTP2 240, which resides on the link cards, has a failsafe mode. When MTP3 250 fails, MTP2 240 will automatically route traffic back down and out to the SEP. MTP2 240 ensures accurate end-to-end transmission of a message across a signaling link 14. In addition, MTP2 240 implements flow control, message sequence validation, and error checking.

The MTP3 250 layer can interface with multiple MTP2 240 processors on the link cards through a compact Peripheral Component Interconnect (cPCI) bus. By modifying the MTP3 250 layer to disable message discrimination, all messages are allowed to be passed up to the ICP Platform 200 for processing. The MTP3 250 layer can be easily modified by making appropriate changes in the SS7 protocol stack being used.

In addition, MTP3 250 manages the Message Signaling Unit (MSU)/Link association and has end to end management message coordination. MTP3 250 also provides message routing between signaling points 210/220 in the SS7 Network, and can route traffic away from failed links and signaling points. Moreover, MTP3 250 controls traffic when congestion occurs.

The Core Services 260 layer supports various support services and signaling processes to distribute traffic upwards to the Applications 270 layer and accept downward message routing requests. The Core Services 260 layer contains various subsystems and processes within these subsystems that developers of applications can use when designing applications.

The Applications 270 layer contains all the applications that are implemented above the Core Services 260 layer. The Applications 270 layer supports various applications that can monitor, modify, or create messages. Each application can process its own set of messages, use its own rules and can be independent of other applications in general. In addition, one or more of the application processes may be running at a given time to load-share the work.

As shown in FIG. 3, a SS7 MTP3 MSU 300 addressed for a signaling point, e.g., 220, travels from a signaling point, e.g., 210, through, the ICP Platform 200. The MSU 300 goes through a MTP1 port 230 and then travels up the SS7 protocol stack through the MTP2 240 I/O card and MTP3 250 stack. The MTP3 250 stack may reside on the CPU card, or on the I/O card. A heartbeat signal 310 is maintained between MTP2 240 and MTP3 250. Loss of the heartbeat 310, indicating a failure of the CPU cards in the MTP3 250 layer, results in a failsafe mode (closed mode). During a failsafe mode, message traffic is passed up only to MTP2 240 and is then routed back down and out. If the CPU is available, a copy of the MSU 300 is passed to MTP3 250 for non-intrusive processing. During normal operation (open mode), data is transmitted between MTP1/MTP2 230/240 and MTP3 250. The MSU 300 is then delivered to Core Services 260 which contains various subsystems and processes within these subsystems. Some of those subsystems and processes will described in detail below.

The Platform Control Subsystem (PCSS) 311 has data provisioning capability and is also responsible for the management of all the other subsystems. In particular it starts and stops all the other processes in a controlled manner. The Signaling Subsystem (SGSS) 312 routes and distributes SS7 messages. This subsystem processes every message that passes through the ICP Platform 200. However, since Fill-in Signal Unit (FISU) messages do not pass up to the ICP platform 200, they are not processed by the SGSS 312. The Interface Subsystem (IFSS) 313 is responsible for the external system interface. In addition, the ICP System has the capability to interface with multiple Intelligent Communications Managers (ICMs) 320, and with other ICP Platforms 200. Moreover, a single ICP Platform 200 may be distributed in multiple processors. The IFSS 313 provides the network interface required for all these conditions.

The Accounting Subsystem (ACSS) 314 is responsible for collecting the Traffic Metering and Measurement (TMM) data and statistic messages from subsystems that generate these messages. The Recording Subsystem (RCSS) 315 is responsible for collecting event and log messages for all other subsystems. Event messages are accumulated over a short period of time while the events are buffered and duplicates are filtered out. The various processes in the Data Management Subsystem (DMSS) 316 provide functions for data storage and retrieval, data synchronization, data distribution, data partition management, etc. Furthermore, the Utility Subsystem (UTSS) 317 contains library routines that are developed for re-use by all subsystem processes.

The Intelligent Communication Manager (ICM) 320, a control and management device, is connected via the TCP/IP link 330 to the ICP Platform 200 for storage and display of logs, alerting, programming control policy rules, providing simple visibility, configuration, and other operational features of the ICP Platform 200. Multiple ICP Platforms 200 can be managed by one ICM 320. Logs are routed via the TCP/IP link 330 from the ICP 200 to the ICM 320 and may range from simple events to full SS7 call or transaction messages. The TCP/IP link 330 provides communication including, but not limited to, File Transfer Protocol (FTP) Services and Internet Services between the ICP 200 and the ICM 320.

The ICP Platform 200 has the capability to view data traversed on MTP2 data links 14 and signaling units, except the Fill-in Signal Unit (FISU). In addition, the ICP Platform 200 can view all MSUs 300, i.e., network management, traffic routing, test and upper layer protocols on MTP3 250 and can decode all Integrated Service Digital Network (ISDN) User Part (ISUP) messages and view all ISUP parameters and sub-fields. While not shown, it is understood that the ICP Platform 200 is can also communicate within an enterprise network with various hosts for providing management, configuration, and reporting functions.

The ICP Platform 200 is a fully active datalink layer (layer 2 of the seven layer Open Systems Interconnect (OSI) network model) device while providing layer three and above visibility and control. Network layer control messages, such as re-alignment messages, are transferred autonomously from node to node, e.g., from the SEP 210 to the SEP 220, within the SS7 network. The ICP Platform 200 manages these messages and coordinates control between the end nodes 210/220. This allows end nodes to operate as masters of MTP2 240, while communicating directly to the ICP Platform 200. MTP3 MSUs 300 are transferred end-to-end making the ICP Platform 200 appear invisible to each SEP 210/220, at the network layer and above.

The ICP Platform 200 is a full MTP2 signaling link terminal. It also manages MTP3 management messages between nodes 210 and 220. Additionally, it manages coordination of MTP3 traffic management, link management, and route management messages to synchronize MTP2 events between the two links. Functionally, the ICP Platform 200 consists of SS7 I/O logic, which contains MTP1/MTP2 230/240, and MTP3 250 SS7 stacks, located on the I/O card. The function of the stacks process MSUs 300 for MTP3 250. Moreover, the ICP Platform 200 contains MTP3 control logic located on the CPU card. These functions work independently of each other and provide a higher level visibility by processing signaling units into MSUs 300 and MSUs into protocol data units (PDUs) (layer 4 and above of the seven layer OSI network model).

FIG. 4 illustrates a functional diagram of the Intelligent Communications Point (ICP) Platform 200. SS7 traffic 400 flows in and out the Signaling Subsystem 312 (SGSS) through the SS7 stack (MTP1/MTP2 230/240 and MTP3 layer 250). SS7 messages are distributed to the processes in the Application Subsystem 270 (APSS). The APSS 270 sends ISUP messages to the SGSS 312 and in some cases the actions that it wants the SGSS 312 to carry out, such as start/stop sending MSU 300, and block an SS7 message. In sum, the ICP Platform 200 combines call state monitoring, line control, and transaction state control for implementing access and service control functions.

The ICP Platform 200 may be implemented with commercially available components as will be understood by those skilled in the art. While not shown, it is understood that the ICP Platform 200 is controlled by computer programming instructions stored in memory within the ICP Platform 200 and potentially other components of the system connected to the ICP Platform 200.

The Platform Control Subsystem (PCSS) 311 is responsible for the management of all other subsystems. PCSS 311 processes, which include the Platform Control Process, the Rule Provisioning Process and the SS7 Provisioning Process, have various responsibilities within the ICP Platform 200. The Platform Control Process is ordinarily the first process to start on the ICP Platform 200 and manages all other processes running on the ICP Platform 200. The Rule Provisioning Process manages the process configuration profile and the application rule repository. This process receives updates from the IFSS 313 and makes updates to the DMSS 316. The SS7 Provisioning Process is responsible for SS7 Node provisioning. This process will receive updates from the IFSS 313 and will make updates to the SS7 stack, using vendor provided programming interfaces.

The Signaling Subsystem (SGSS) 312, which is part of the core services layer 260, contains the ISDN User Part (ISUP) process 410, the Signaling Connection Control Point (SCCP) process 420, the Signaling Network Management 430 (SNM) and the Signaling Network Testing 430 (SNT). All ISUP process 410 and SCCP process 420 traffic can be processed through a SS7 firewall to enforce control policy rules. Management messages such as re-alignment messages are controlled by the ICP Platform's 200 control message manager application. Some of the common functions provided by the ISUP process 410, SCCP process 420 and SNM/SNT 430 are to generate events to report process start and stop and to report abnormalities. In addition, they inform the MTP3 layer 250 of any status change so that traffic can be started or stopped.

The ISUP process 410 contained in the SGSS 312 is responsible for receiving and forwarding ISUP messages between the MTP3 layer 250 and the Application Layer 270. This process maintains connectivity to the Application Layer 270 process and determines readiness of the ISUP message processing capability, and decodes and encodes the ISUP header. In addition, the ISUP process 410 distributes messages to the Application Layer 270 processes, discards message response if timeout occurs, and takes default action if message response timeout occurs.

The SCCP process 420 is responsible for receiving and forwarding SCCP messages between the MTP3 layer 250 and the Application Layer 270. The SCCP process 420 provides communications between signaling nodes 210 and 220 and provides specialized routing and management functions necessary to support routing to partitioned and/or duplicate databases. In addition, this process returns messages back to MTP3 250 when message is checked OK.

The SNM/SNT process 430 is responsible for receiving and forwarding SNM/SNT, and in particular the Link Status Signal Unit (LSSU) messages and any other messages that the ISUP process 410 and SCCP 420 process can not process. In addition, SNM/SNT process 430 generates Traffic Metering and Measurement (TMM) data and generates events to report LSSU data.

The APSS 270 sends MSUs 300 to the ICM 320 through the Interface Subsystem 313 (IFSS). TMM data is generated by both the APSS 270 and the SGSS 312. Statistics are only generated by the APSS 270 and are sent to the ICM 320 through the Accounting Subsystem 314 (ACSS). Every subsystem generates events and logs that are sent to the ICM 320 through the Recording Subsystem (RCSS) 315.

Figure 5:
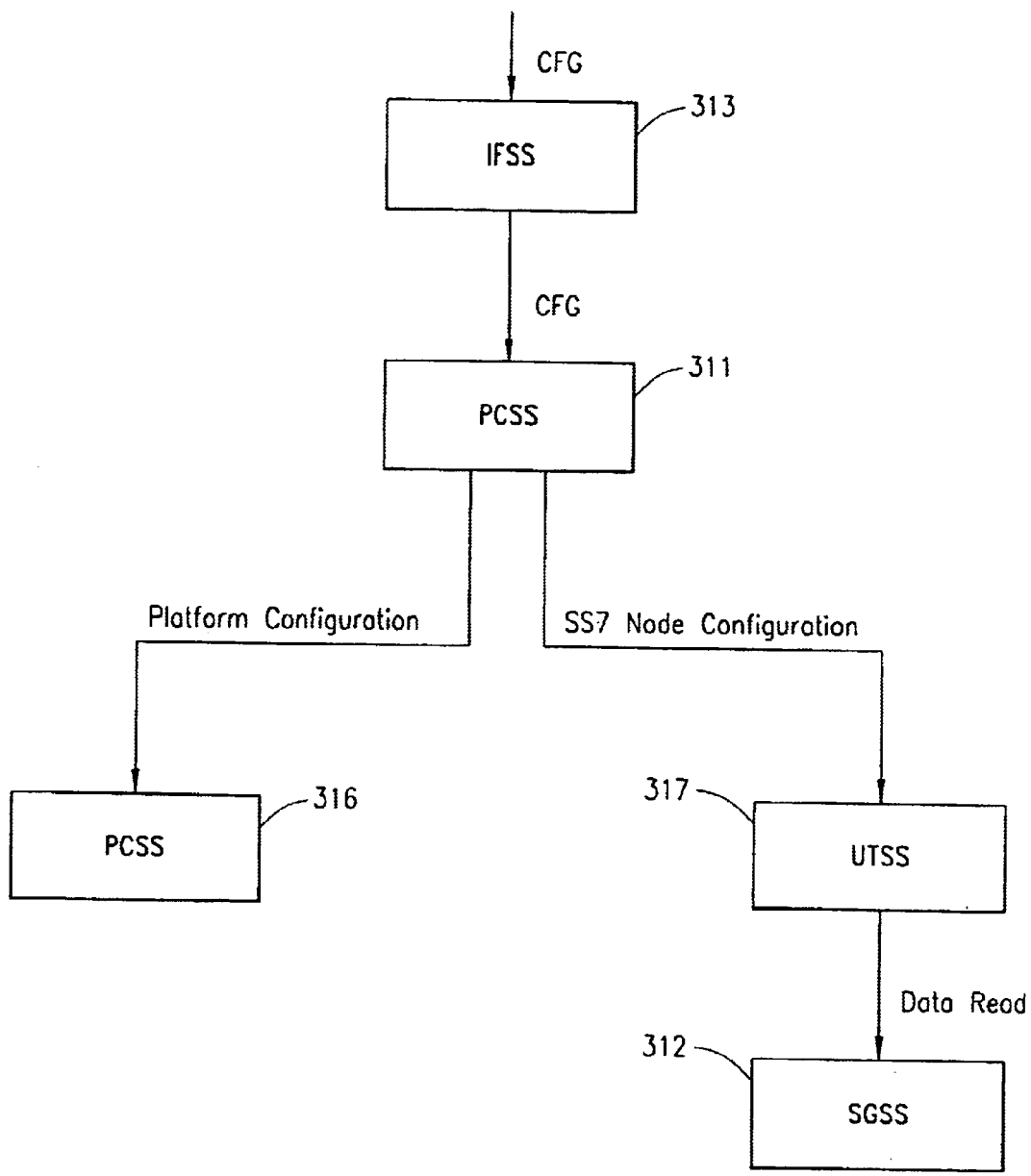
FIG. 5 is a block diagram of the configuration data flow.
Figure 6:
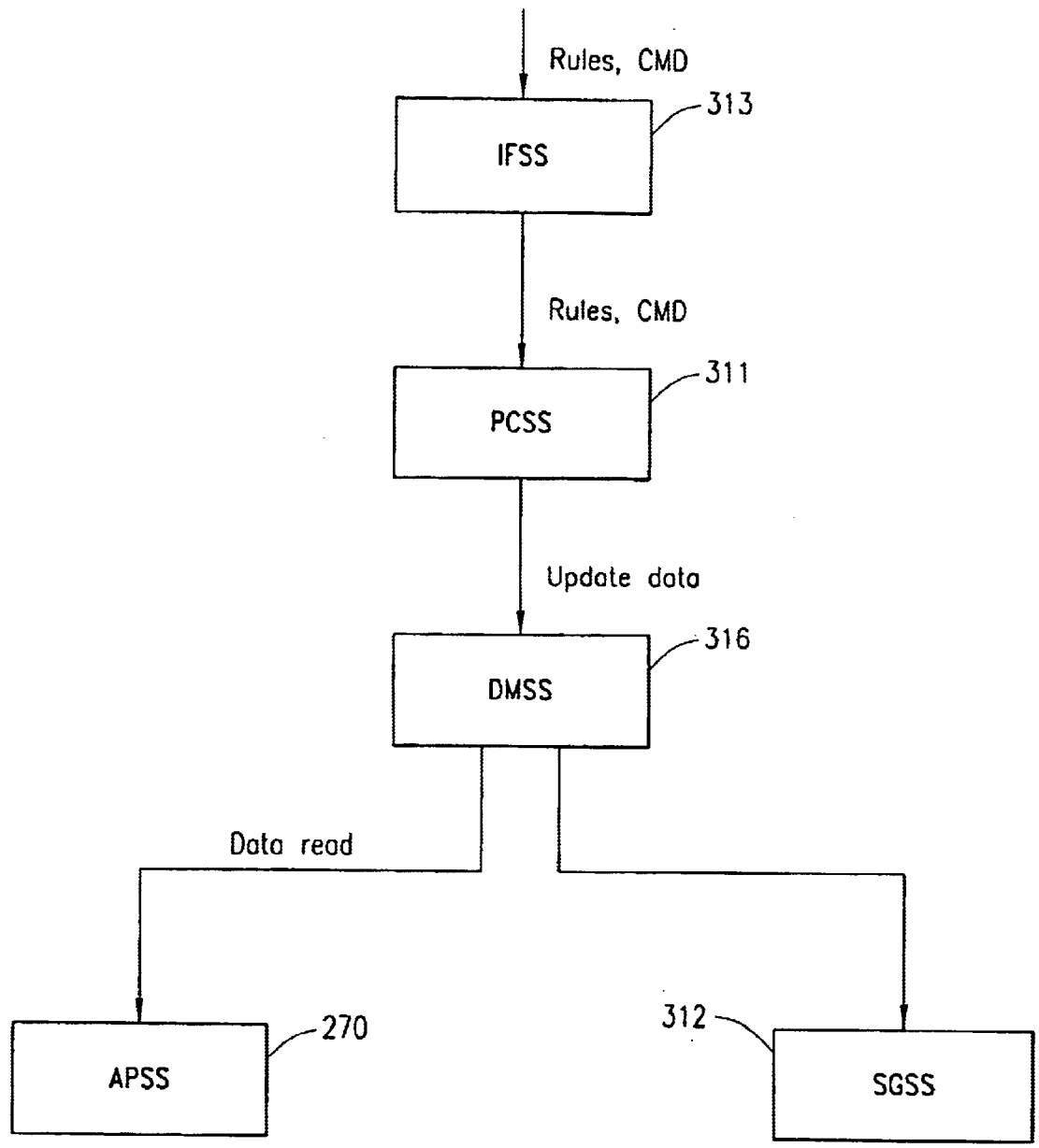
FIG. 6 is a block diagram of the provisioning data flow.

The ICM 320 provides configuration data for the ICP Platform 200 and the SS7 stack. As illustrated in FIG. 5, configuration data is sent to the PCSS 311 through the IFSS 313. The PCSS 311 updates the database with platform configuration through the DMSS 316. SS7 node configuration is sent to the UTSS 317. UTSS 317 interfaces with the SS7 stack (vendor software portion) to change stack configuration. In addition, the ICM 320 provides rules to the APSS 270 and SGSS 312, which use the rules to determine message distribution and processing. Rules are first passed to the Platform Control Subsystem 311 (PCSS) which updates the database at the Data Management Subsystem 316 (DMSS). As illustrated in FIG. 6, rules are first passed from the IFSS 313 to the PCSS 311 which updates the database at the DMSS 316. The APSS 270 and the SGSS 312 then read the rules as needed. The ICM 320 also sends the rule switching command (CMD) to the PCSS 311, which is processed and used in the same way as the rules.

Figure 7:
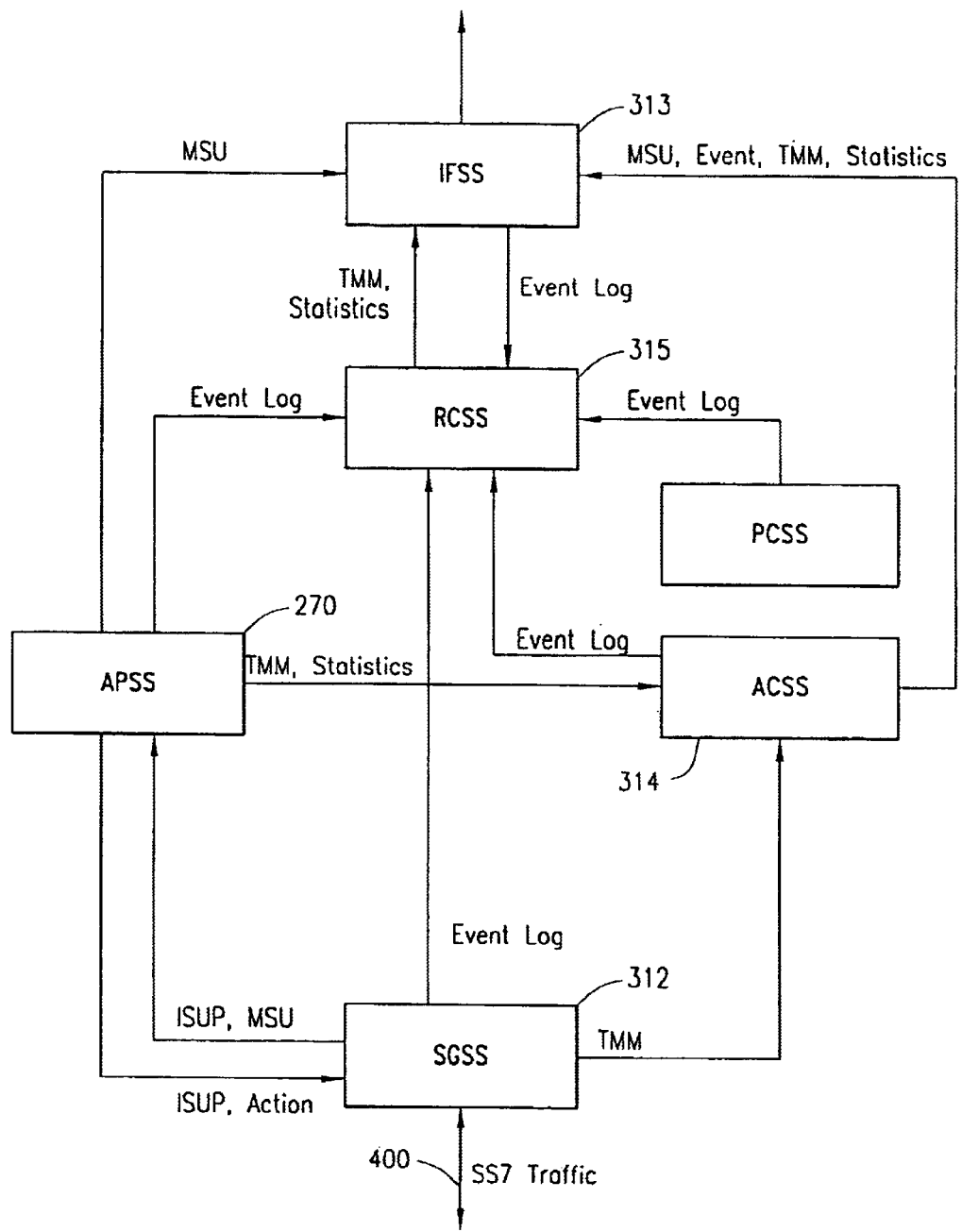
FIG. 7 is a block diagram of the processing data flow.

FIG. 7 illustrates SS7 traffic 400 distribution and supporting data flow in the system. SS7 traffic 400 flows in and out the SGSS 312. ISUP and MSU messages are distributed to the processes in the APSS 270. The APSS 270 sends ISUP messages to the SGSS 312. The APSS 270 sends MSU data through the IFSS 313. TMM data is generated by both the APSS 270 and the SGSS 312 and is sent to the ICM 320 through the ACSS 314. Statistics are generated by the APSS 270 and are sent to the ICM 320 through the ACSS 314. Every subsystem generates event and log data that are sent to the ICM 320 through the RCSS 315.

It is understood that the present invention can take many forms and embodiments. The embodiments shown herein are intended to illustrate rather than to limit the invention, it being appreciated that variations may be made without departing from the spirit of the scope of the invention. The algorithms and process functions performed by the system may be organized into any number of different modules or computer programs for operation on one or more processors or workstations within the system. Different configurations of computers and processors for the system are contemplated. The programs used to implement the methods and processes of the system may be implemented in any appropriate programming language and run in cooperation with any hardware device. The system may be used for service providers, Internet Service Providers, enterprises, and may other entities utilizing SS7 signaling devices.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. Apparatus for intelligently redirecting data traffic from a Public Switched Telephone Network (PSTN) to a data network, the apparatus comprising:

an intelligent communications platform connected (ICP) between a switch and a Signaling System 7 (SS7) network to intercept SS7 messages between the switch and the SS7 network; and a communications control module connected to the ICP via a communication link, the communications control module for providing management and communications to the ICP and providing access to the management and communication for a plurality of subscribers.

2. The apparatus of claim 1 wherein the ICP includes:

an SS7 I/O card for processing SS7 messages; and a CPU card for processing ISUP and TCAP.

3. The apparatus of claim 1 wherein the communications control module includes:

instructions for communicating with other ICPs for updated information on congestion on certain routes.

4. The apparatus of claim 1 wherein the communications control module includes:

instructions for the plurality of subscribers to enter respective access line availability, alternative access numbers; and instructions for a plurality of users to populate respective user profiles.

5. The apparatus of claim 1 further including:

an applications layer for hosting SS7 applications;

a core services layer for providing a plurality of core services and interconnected to the applications layer;

an interface to the Message Transfer Part layer 3 (MTP3) for receiving MTP3 messages and interconnected to the core services layer; and an interface to the Message Transfer Part layer 1 (MTP1) and the Message Transfer Part layer 2 (MTP2) for receiving MTP1 and MTP2 messages and interconnected to the interface to the MTP3.

6. The apparatus of claim 5 wherein the interface to the MTP1/MTP2 includes at least two MTP1/MTP2 processors.

7. The apparatus of claim 5 wherein the core service layer supports a plurality of support services and signaling processes to distribute traffic to the applications layer and accept downward message routing requests.

8. The apparatus of claim 5 wherein the applications layer supports a plurality of applications that monitor, modify or create messages.

9. A method for intelligently redirecting data traffic from a Public Switched Telephone Network (PSTN) to a data network, the method comprising:

connecting an intelligent communications platform (ICP) to a switch and a Signaling System 7 (SS7) network to intercept SS7 messages between the switch and the SS7 network; and connecting a communications control module to the ICP via a communication link, the communications control module for providing management and communications to the ICP and providing access to the management and communication for a plurality of subscribers.

10. The method of claim 9 wherein further including:

processing SS7 messages at an SS7 I/O card within the ICP; and processing ISUP and TCAP messages at a CPU card within the ICP.

11. The method of claim 9 further including:

communicating with other ICPs for updated information on congestion on certain routes.

12. The method of claim 9 further including:

providing an interface for the plurality of subscribers to enter respective access line availability, alternative access numbers; and providing an interface for a plurality of users to populate respective user profiles.

13. The method of claim 9 further including:

hosting SS7 applications on an applications layer;

providing a plurality of core services at a core services layer where the core services layer is interconnected to the applications layer;

receiving MTP3 messages an interface to the Message Transfer Part layer 3 (MTP3) where the MTP3 is interconnected to the core services layer; and receiving Message Transfer Part layer 1 (MTP1) and Message Transfer Part layer 2 (MTP2) messages at an interface to the MTP1 and the MTP2 where the interface to the MTP1 and the MTP2 is interconnected to the interface to the MTP3.

14. The method of claim 13 wherein the interface to the MTP1/MTP2 includes at least two MTP1/MTP2 processors.

15. The method of claim 13 wherein the core service layer supports a plurality of support services and signaling processes to distribute traffic to the applications layer and accept downward message routing requests.

16. The method of claim 13 wherein the applications layer supports a plurality of applications that monitor, modify or create messages.

17. Apparatus for intelligently redirecting data traffic from a Public Switched Telephone Network (PSTN) to a data network, the apparatus comprising:

an intelligent communications platform connected (ICP) between a switch and a Signaling System 7 (SS7) network to intercept SS7 messages between the switch and the SS7 network;

a communications control module connected to the ICP via a communication link, the communications control module for providing management and communications to the ICP and providing access to the management and communication for a plurality of subscribers;

an SS7 I/O card for processing SS7 messages;

a CPU card for processing ISUP and TCAP;

an applications layer for hosting SS7 applications;

a core services layer for providing a plurality of core services and interconnected to the applications layer;

an interface to the Message Transfer Part layer 3 (MTP3) for receiving MTP3 messages and interconnected to the core services layer; and an interface to the Message Transfer Part layer 1 (MTP1) and the Message Transfer Part layer 2 (MTP2) for receiving MTP1 and MTP2 messages and interconnected to the interface to the MTP3.

* * * * *